April 11, 1950 — R. D. NELSON — 2,503,965
EXPULSION GAP
Original Filed Sept. 8, 1941
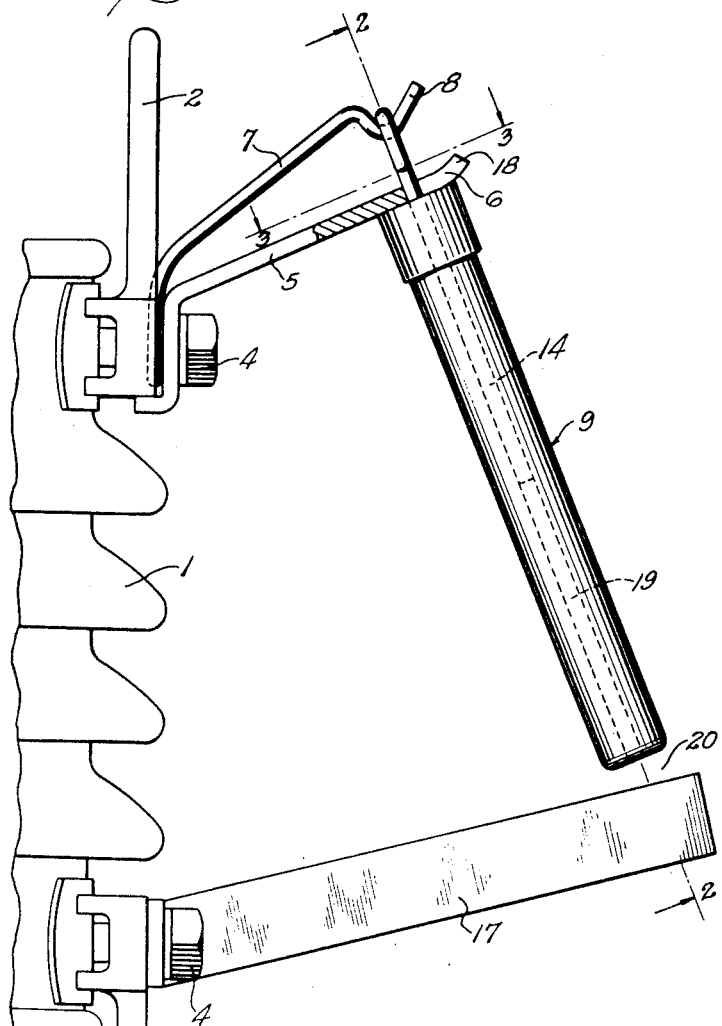
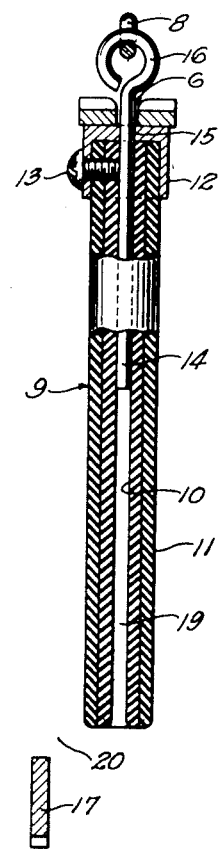
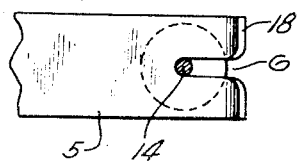
INVENTOR.
ROLLAND D. NELSON
BY Chester W. Brown
ATTORNEY.

Patented Apr. 11, 1950

2,503,965

UNITED STATES PATENT OFFICE 2,503,965

EXPULSION GAP

Rolland D. Nelson, Hales Corners, Wis., assignor to McGraw Electric Company, a corporation of Delaware Original application September 8, 1941, Serial No. 409,925. Divided and this application March 21, 1945, Serial No. 583,995

2 Claims. (Cl. 173—324)

This invention relates to protective apparatus for electrical equipment and transmission lines and has especially to do with lightning arresters of a variety designated "expulsion gaps."

This application is a division of my application for Letters Patent covering "Expulsion device," Serial Number 409,925, filed September 8, 1941, now abandoned.

Generally, an expulsion gap comprises a pair of electrodes, one of which is connected to the line and the other of which is connected to ground; and a spark gap between the electrodes, the gaps being partially enclosed by a fiber tube carried by one of the electrodes. When lightning or any other electrical surge disturbs the line, the gap is sparked over to relieve the line of its electrical stress.

The arc established between the electrodes causes a fault to be temporarily established between the power line and the ground at the gap, and 60-cycle, short circuit current begins to flow through the gap chamber. The heat of this arc in combination with moisture driven out of the fiber lining of the tube generates a high pressure within the fiber enclosure. This pressure is relieved through the open end of the tube and blows the arc out, thereby removing the fault. The expulsion action lasts until the 60-cycle current wave passes through zero. At this point the fault is eliminated and the line is restored to normal operative condition.

One object of this invention is to provide an expulsion device wherein the electrodes remain in fixed position relative to each other at all times, regardless of any damage to the tube, thereby always providing a safety valve on the line and giving full protection to the electrical equipment on the line.

Another object is to provide an expulsion device having a mounting means adapted to removably receive the expulsion tube and one of the electrodes in fixed, independent relationship to the other of the electrodes.

More specifically, it is an object to provide an expulsion device comprising a hook and eye type mount, an expulsion tube and electrode assembly removably carried by the hook and eye mount and a second electrode disposed in spaced relationship to the first electrode and out of axial alignment with the assembly, thereby permitting insertion or removal of the assembly by an operator by means of a hot-line operating stick.

A still further object is to provide an expulsion device having electrodes positioned relative to each other in such a manner that shorting of the line between these electrodes by birds is reduced to a minimum.

Further, an object is to provide an expulsion device having mounting means adapted to receive an expulsion tube in fixed gap forming position and which tube may be quickly removed from mounted position by striking the tube from one side thereof with any suitable object.

In the drawings:

Fig. 1 is an elevational view, partly in section, showing the improved expulsion device.

Fig. 2 is a view taken on the line 2—2 of Fig. 1.

Fig. 3 is a view taken on the line 3—3 of Fig. 1.

My expulsion device comprises an insulating support 1 provided at its upper and lower ends with terminal members 2 and 3, respectively, secured in place by means of the bolts 4.

A resilient conductor arm 5 is secured to the upper terminal 2 by means of the bolt 4. The outer end of the conductor arm 5 is provided with a slot 6. A resilient, wire-like holding arm 7 is secured to the terminal 2 by means of the bolt 4 and extends above the conductor arm 5 and terminates in a hooked portion 8 adapted to receive the expulsion tube 9.

The expulsion tube 9 comprises an inner fiber tube 10 and an outer tube 11 composed of insulating material such as phenolic resin. The upper end of the expulsion tube 9 is provided with a metal cap 12 secured to the tubes 10 and 11 by means of a screw 13 which extends into the bore of the inner tube 10, operating to hold the electrode 14 in position, as shown in Fig. 2. The upper end of the electrode 14 extends out through an opening 15 provided in the cap 12 and terminates in an eye member 16 adapted to be received on the hooked portion 8.

The lower electrode 17 is secured to the lower terminal member 3 by means of bolt 4 and is disposed at the lower end of expulsion tube 9 to one side thereof, out of axial alignment therewith.

The expulsion tube 9 is mounted in position by inserting the lower end of the tube in the gripping head of a specially constructed hot-line stick. The eye member 16 of the electrode 14 is then positioned on the hook portion 8. The tube 9 is then moved in a clockwise direction relative to Fig. 1 about the hook 8 in a plane including the members 1, 5, and 17 until the outer end of the conductor arm 5 rides over the upper end of the cap 12 and the upper end of the electrode 14 moves into the slot 6. It is to be noted that the outer end of the conductor arm 5 is curved arcuately upwardly at 18 to permit the tube 9 to ride into position and bias the members 5 and 7 relative to each other.

An electrical discharge path is established through this device, through the terminal 2, the member 7, the electrode 14, the expulsion chamber 19, the air gap 20, the electrode 17, and the lower terminal 3.

The terminals 2 and 3 may be slotted (not shown) to make possible the use of bifurcated connectors (not shown) therewith to effect line connections for the expulsion device.

The expulsion tube 9 may be easily removed from mounted position by striking the side of the tube 9 near the insulator support 1 with any suitable means, thereby quickly and easily disengaging the eye member 16 from the hook portion 8.

When pressures are built up within the expulsion chamber 19, sufficient to burst the tube members 10 and 11, the total gap distance between the electrodes 14 and 17 is not disturbed and the system is left protected. The only difference in the expulsion device under these conditions is that the expulsion chamber 19 has been destroyed and the air gap 20 has been lengthened to extend between the electrodes 14 and 17.

In the event the expulsion action of the device has been destroyed, the electrodes 14 and 17 together with the extended air gap 20 provide a safety valve for the system. This safety valve operates in the manner of an ordinary spark gap without the expulsive characteristics. When the extended air gap is flashed over, the arc is extinguished when the circuit is interrupted by the blowing of the line fuse. After this the damaged expulsion tube is replaced by a new tube and electrode assembly by means of a specially constructed hot-line operating stick.

From the foregoing description it is apparent that the objects of this invention have been accomplished by providing an expulsion device having an expulsion tube and electrode assembly adapted to be easily and quickly mounted in operating position; having mounting means adapted to maintain the electrodes in fixed position relative to each other under all conditions of operation and to provide means for rapid and easy installation of the tube and electrode assembly in operating position.

I claim:

1. An expulsion device comprising an insulating support, a terminal arm, and a resilient arm carried by said support adjacent said terminal arm, an expulsion tube, and an electrode including a portion exteriorly of said tube, a portion interiorly of said tube and an eye external of said tube, said portion of said electrode exteriorly of said tube engaging said terminal arm and said eye engaging said resilient arm and comprising means for mounting said electrode and said terminal tube on said arm.

2. In a protective device for electrical apparatus, the combination with an insulating support including an electrically conductive arm secured thereto at one end and having its other end slotted, of a resilient conductive arm secured at one end to the first mentioned arm and having its other end hook-shaped and disposed adjacent said slot in spaced relation thereto, the plane of the hook being normal to the plane of said slot, an expulsion tube having a conductive cap at one end contacting a side of the first mentioned arm opposite that upon which said resilient arm is disposed, an electrically conductive rod extending through said cap and into said tube, said rod having a portion in said slot and including an eye engaging said hook-shaped end, and means securing said rod in said tube, said resilient arm biased to hold said cap in contact with the first mentioned arm.

ROLLAND D. NELSON.

REFERENCES CITED

The following references are of record in the file of this patent:

UNITED STATES PATENTS

| Number | Name | Date |
|--------|------|------|
| 1,946,815 | Skipper | Feb. 13, 1934 |
| 1,958,496 | Rah | May 15, 1934 |
| 2,049,552 | Walsh | Aug. 4, 1936 |
| 2,203,439 | Fox | June 4, 1940 |